United States Patent
Steiner, Jr. et al.

(10) Patent No.: US 7,837,179 B2
(45) Date of Patent: Nov. 23, 2010

(54) SPARE TIRE CARRIER HAVING OVERLOAD PROTECTION WITH CONTROLLED CABLE PAYOUT

(75) Inventors: Walter J. Steiner, Jr., Rochester Hills, MI (US); Tony Voegeli, Ft. Wayne, IN (US); Jeffrey M. Stephens, Lake Orion, MI (US); Peter Pelech, Auburn Hills, MI (US)

(73) Assignee: Dura Global Technologies, LLC, Rochester Hills, MI (US)

( * ) Notice: Subject to any disclaimer, the term of this patent is extended or adjusted under 35 U.S.C. 154(b) by 182 days.

(21) Appl. No.: 11/856,389

(22) Filed: Sep. 17, 2007
(Under 37 CFR 1.47)

(65) Prior Publication Data
US 2009/0032786 A1 Feb. 5, 2009

Related U.S. Application Data

(63) Continuation-in-part of application No. 11/216,428, filed on Aug. 31, 2005, now Pat. No. 7,404,545.

(60) Provisional application No. 60/606,443, filed on Aug. 31, 2004.

(51) Int. Cl.
*B66D 1/00* (2006.01)
*B62D 43/00* (2006.01)
(52) U.S. Cl. .................... 254/323; 414/463
(58) Field of Classification Search .............. 254/323, 254/378; 414/463, 466
See application file for complete search history.

(56) References Cited
U.S. PATENT DOCUMENTS 4,059,197 A * 11/1977 Iida .......................... 414/463
4,535,973 A * 8/1985 Dorr et al. .................. 254/323
4,544,136 A * 10/1985 Denman et al. ............. 254/323
4,625,947 A * 12/1986 Denman et al. ............. 254/323
4,997,164 A * 3/1991 Kito et al. .................. 254/323
5,251,877 A * 10/1993 Rempinski et al. .......... 254/323
5,368,280 A * 11/1994 Ng ............................ 254/376

(Continued)

*Primary Examiner*—Evan H Langdon
(74) *Attorney, Agent, or Firm*—Gifford, Krass, Sprinkle, Anderson, Citkowski, P.C.; Kevin S. McKenzie; Dean B. Watson

(57) ABSTRACT

A tire carrier assembly is operative to provide a controlled payout of cable in response to an application of a minimum predetermined amount of force upon the tire carrier assembly. The tire carrier assembly includes a housing having a bottom wall and a side wall extending outwardly from the bottom wall defining an interior space. A rotation shaft is coupled to the housing and having a longitudinal axis. A sheave is coupled to the shaft and rotatable about the longitudinal axis. A gear member extends from the sheave and is rotatable therewith about the longitudinal axis. A pin fixedly secured to the housing. A torque plate has a gear portion epicyclically engaged with the gear member of the sheave. The torque plate has an arm portion extending generally radially outwardly with respect to the gear portion. The torque plate has a closed-ended slot formed in the arm portion and receiving the pin therethrough. The arm portion has legs extending along opposite sides of the slot. At least one of the legs has a weakened area at which the arm portion deforms in response to an application of a predetermined amount of force upon the tire carrier assembly and contacts an inner surface of the housing to provide a controlled payout of a cable from the sheave.

23 Claims, 8 Drawing Sheets

U.S. PATENT DOCUMENTS

| | | | |
|---|---|---|---|
| 5,415,377 A * | 5/1995 | Britt et al. .................... | 254/323 |
| 6,132,162 A * | 10/2000 | Kito et al. .................... | 414/463 |
| 6,409,454 B1 * | 6/2002 | Yamamoto ................. | 414/463 |
| 6,554,253 B1 * | 4/2003 | Dobmeier et al. ............ | 254/323 |
| 6,923,394 B2 * | 8/2005 | Goldstein .................... | 242/323 |
| 7,404,545 B2 * | 7/2008 | Steiner et al. ................ | 254/323 |
| 2006/0169958 A1 * | 8/2006 | Steiner et al. ................ | 254/323 |

\* cited by examiner

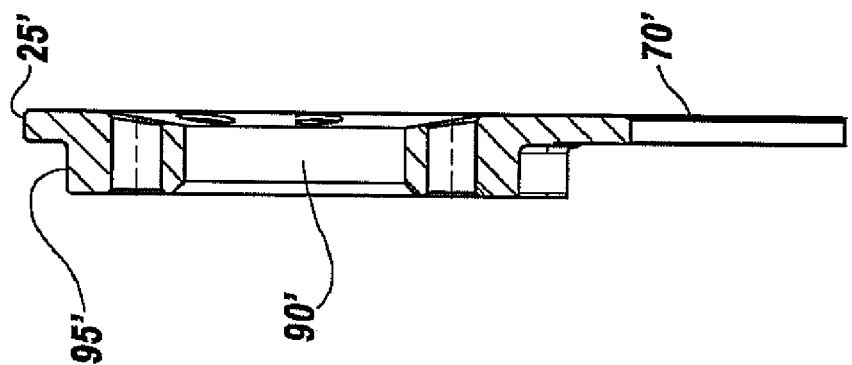
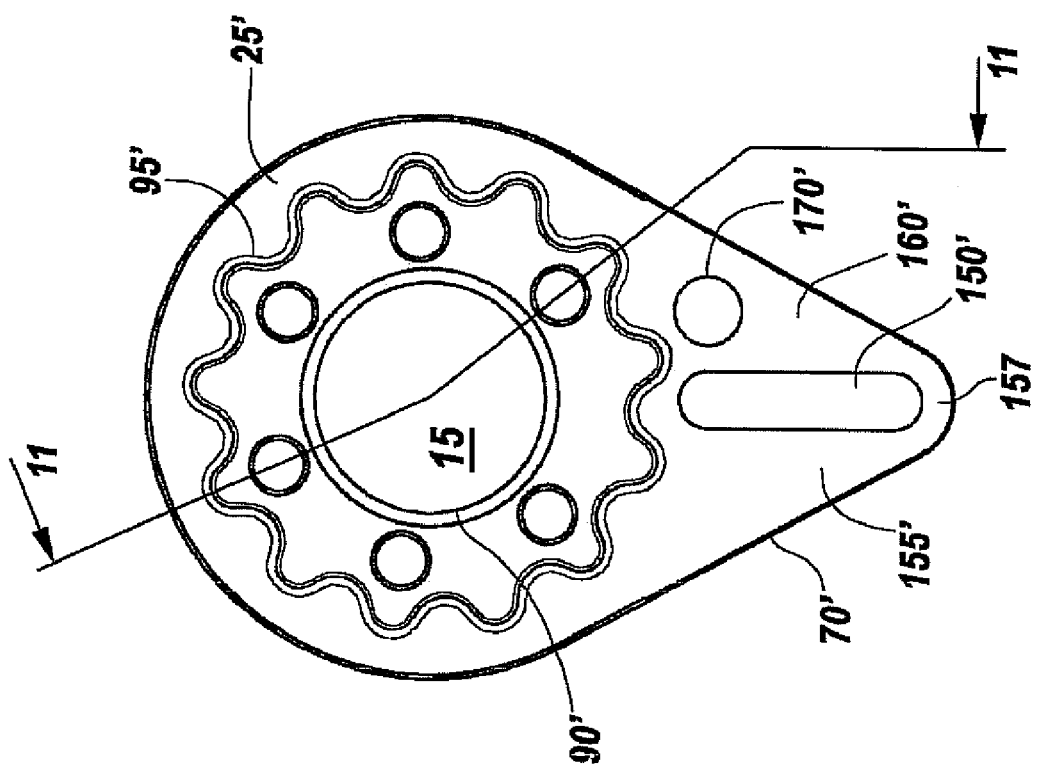

US 7,837,179 B2

SPARE TIRE CARRIER HAVING OVERLOAD PROTECTION WITH CONTROLLED CABLE PAYOUT

REFERENCE TO RELATED APPLICATIONS

This application is a continuation-in-part of co-pending U.S. patent application Ser. No. 11/216,428 filed on Aug. 31, 2005 and Ser. No. 60/606,443 filed Aug. 31, 2004, the contents of which are incorporated herein by reference in their entirety.

FIELD OF THE INVENTION

The invention relates to spare tire carriers, and more particularly to spare tire carriers having overload protection.

BACKGROUND

Various spare tire carriers have been utilized in the past and are well known in the art. Typically, spare tire carriers are designed to hold a spare wheel below the body frame of a vehicle. Generally, the spare tire carrier includes a cable associated with a winch or drive mechanism to raise and lower the tire when needed. Various U.S. Pat. Nos. 4,059,197; 4,535,973; 4,600,352; 4,625,947; 5,251,877; 5,265,708 and 5,415,377 are related to spare tire carrier designs.

However, none of these prior art designs teach or suggest a spare tire carrier having overload protection with a controlled cable payout. Specifically, there is a need in the art for a spare tire carrier wherein a cable is released allowing the tire to separate from the tire carrier mechanism at a predetermined load; thereby allowing the cable to unwind from a spool such that the cable is prevented from being exposed to high loading forces. Additionally, there is a need in the art for a controlled cable payout in which the rate of the release of the cable can be controlled to avoid a rapid uncontrolled movement of a spare tire

SUMMARY OF THE INVENTION

According to one aspect of the invention, a tire carrier assembly is operative to provide a controlled payout of cable in response to an application of a minimum predetermined amount of force upon the tire carrier assembly. The tire carrier assembly includes a housing having a bottom wall and a side wall extending outwardly from the bottom wall defining an interior space. A rotation shaft is coupled to the housing and having a longitudinal axis. A sheave is coupled to the shaft and rotatable about the longitudinal axis. A gear member extends from the sheave and is rotatable therewith. A pin fixedly secured to the housing. A torque plate has a gear portion epicyclically engaged with the gear member of the sheave. The torque plate has an arm portion extending generally radially outwardly with respect to the gear portion. The torque plate has a closed-ended slot formed in the arm portion and receiving the pin therethrough. The arm portion has legs extending along opposite sides of the slot. At least one of the legs has a weakened area at which the arm portion deforms in response to an application of a predetermined amount of force, which allows the torque plate to rotate about the longitudinal axis and contact an inner surface of the housing to provide a controlled payout of a cable from the sheave.

According to another aspect of the invention, a tire carrier assembly includes a sheave, a cable, and a torque plate. The sheave is rotatable about a rotational axis. The cable has an end coupled to the sheave for winding thereabout or payout therefrom during corresponding rotation of the sheave about the rotational axis. The torque plate is coupled to the sheave by a gear arrangement and movable generally epicyclically with respect to the sheave during winding and payout of the cable from the sheave. The tire carrier assembly further includes a force-responsive component operatively coupled to the torque plate and having a first state in which the torque plate is limited to the generally epicyclical movement during the winding and payout of the cable from the sheave. The force-responsive component further includes a second state in which the force-responsive component is deformed and allows the torque plate to rotate about the rotational axis in a non-epicyclical manner and to contact an adjacent component within the tire carrier assembly so as to control payout of the cable from the sheave, wherein the second state is initiated by an application of a threshold amount of force upon the tire carrier assembly.

BRIEF DESCRIPTION OF THE DRAWINGS

FIG. 10 is a top view of a torque plate according to an alternate embodiment of the invention FIG. 11 is a side view of the torque plate of FIG. 10;

DETAILED DESCRIPTION OF THE PREFERRED EMBODIMENTS

The present invention provides a tire carrier assembly that supports a tire on a cable and allows for winding and payout of the cable from a sheave to raise and lower the tire, respectively, relative to the tire carrier assembly. Described in greater detail below, the tire carrier assembly includes a force-responsive component that, on one hand, allows for normal winding and payout of the cable for raising and lowering the tire, and, on the other band, allows for a controlled payout of the cable from the sheave in the event of an unplanned application of force externally upon the tire carrier assembly.

Figure 1:
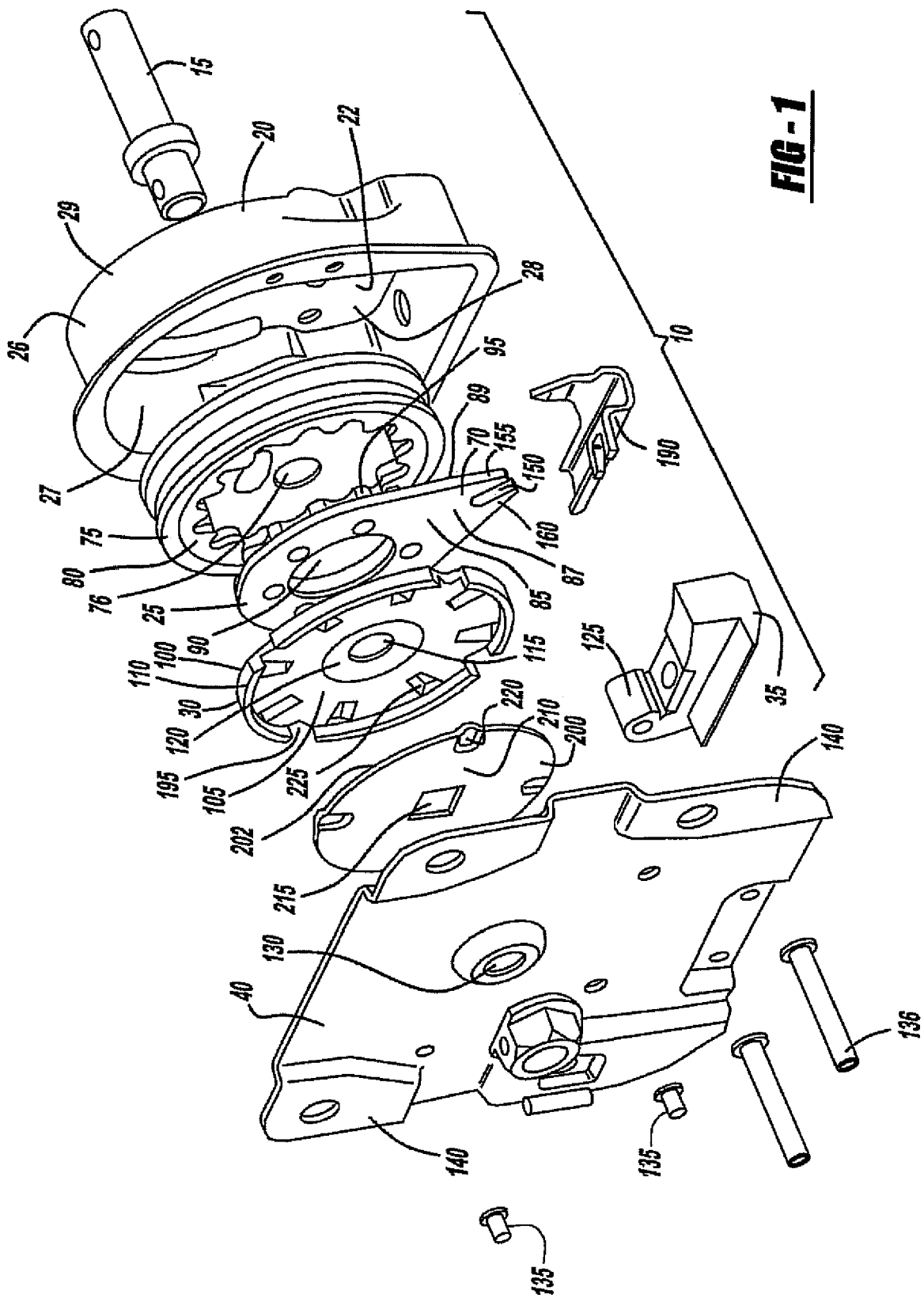
FIG. 1 is an exploded perspective view of a tire carrier assembly according to the invention.

Referring to FIG. 1, a tire carrier assembly according to the invention is generally indicated at 10. The tire carrier assembly 10 includes a rotation shaft 15, a housing 20, a torque plate 25, an eccentric bushing 30, a cable guide 35, a sheave 75 and a cover plate 40.

The housing 20 includes a bottom wall 22 having a first aperture 24 formed therein receiving the shaft 15. The housing 20 also includes a sidewall 26 that extends upward from the bottom wall 22 and defines an interior space 28 of the housing 20. The sidewall 26 includes opposite inner 27 and outer 29 surfaces. As will be described in more detail below, an arm portion 70 of the torque plate 25 contacts the inner surface of the housing 20 after a force-responsive component of the tire carrier assembly 10 deforms or breaks in response to an application of a predetermined amount of force upon the tire carrier assembly 10.

The sheave 75 is disposed within the interior space 28 of the housing 20. The sheave 75 includes a second aperture 76 that receives the shaft 15 therethrough. The sheave 75 also includes a gear member 80 associated therewith. In one aspect of the invention, the gear member 80 is insert molded to bond the gear member 80 on an inner portion of the sheave 75. The gear member 80 is generally coaxial with the shaft 15.

The torque plate 25 is positioned adjacent the sheave 75. The torque plate 25 includes a base 85 having opposing first 87 and second 89 surfaces. The torque plate 25 has a third aperture 90 formed therein that receives the shaft 15 therethrough. A gear portion 95 extends from the torque plate 25 generally aligned with the third aperture 90 and is adapted to epicyclically engage the gear member 80 of the sheave 75. The torque plate 25 also includes an arm portion 70 that projects radially from the base 85.

The eccentric bushing 30 is positioned adjacent the torque plate 25. The bushing 30 has opposing first 100 and second 105 surfaces generally extending between an integrally formed bounding wall 110. The bushing 30 includes a fourth aperture 115 that receives the shaft 15 therethrough. The first surface 100 of The bushing 30 includes a cam 120 formed thereon. The cam 120 is positioned within the third aperture 90 of the torque plate 25.

The cable guide 35 is positioned within the internal space 28 of the housing 20 and is located radially outboard relative to the sheave 75 for positioning a cable about the sheave 75. The cable guide 35 includes a lobe 125 extending therefrom for contacting the cable to ensure proper winding of the cable about the sheave 75.

The cover plate 40 is disposed adjacent the eccentric bushing 30. The cover plate 40 includes a fifth aperture 130 formed therein that receives the shaft 15 therethrough. The cover plate 40 is attached to the housing 20 utilizing rivets 135 or other fasteners suitable for such a connection. The cover plate 40 may include location ledges 140 formed thereon to provide location features when mounting the cover plate 40 to a vehicle.

Figure 3:
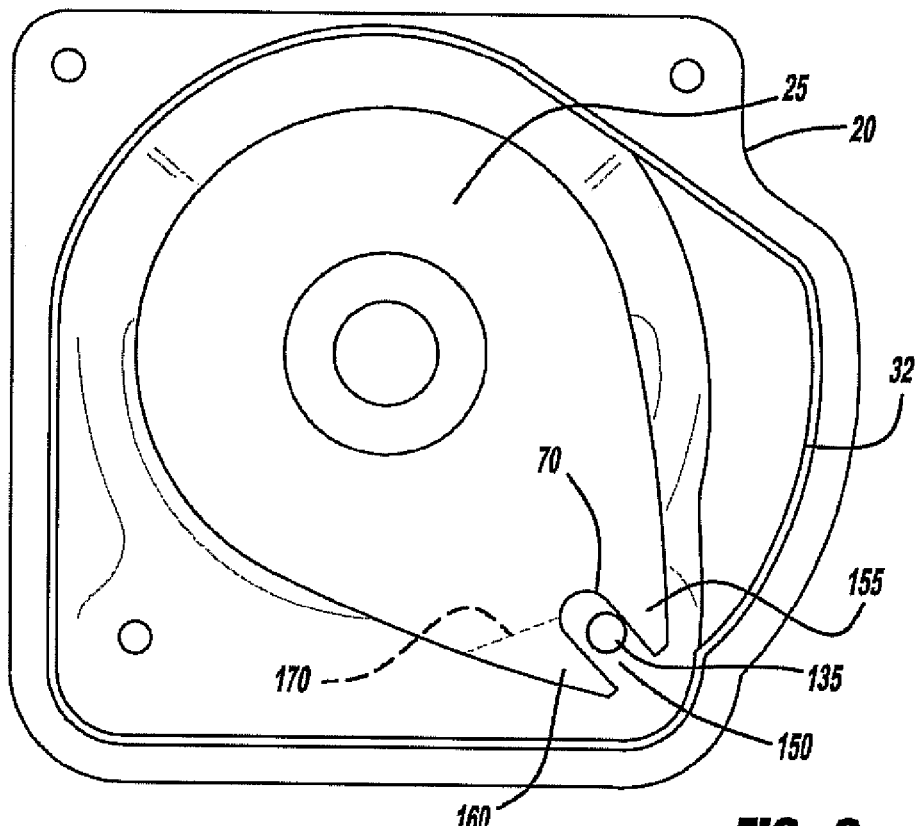
FIG. 3 is a plan view of the housing, torque plate and rivet of the tire carrier assembly according to an alternate embodiment of the invention.

In one embodiment of the tire carrier assembly 10, a longitudinally extending slot or notch 150 is formed in the arm portion 70 of the torque plate 25. The notch 150 is open ended and extends transversely between spaced apart forward 155 and trailing 160 legs of the arm portion 70. As best shown in FIG. 3, a pin or rivet 135 is supported by the housing 20 and the cover plate 40, such that the rivet 135 extends through the notch 150 formed in the arm portion 70. In this embodiment of the tire carrier assembly 10, the rivet 135 is the frangible component.

As stated above, the tire carrier assembly 10 of the invention includes a frangible component that breaks upon application of a predetermined force, allowing the torque plate 25 to rotate about the shaft 15, such that the arm portion 70 of the torque plate 25 engages the inner surface 27 of the sidewall 26 of the housing 20 and allows a controlled payout of cable wound about the sheave 75.

Figure 2:
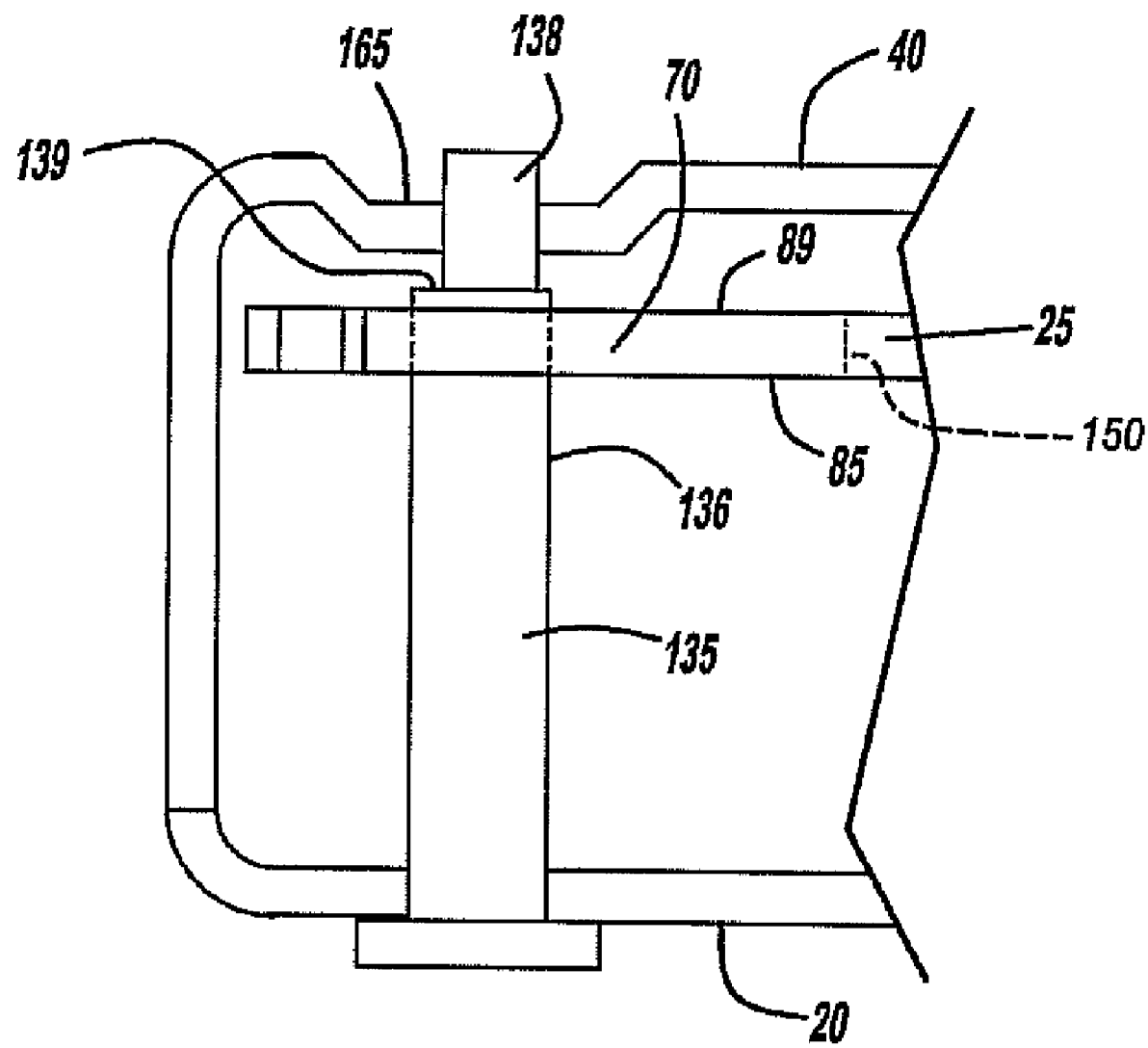
FIG. 2 is a partial front view of the housing, torque plate and rivet of the tire carrier assembly, according to one embodiment of the invention, wherein the rivet is a frangible component.

Referring to FIG. 2, an embodiment of the tire carrier assembly 10 is shown, wherein the rivet 135 is the frangible component. The rivet 135 includes generally concentric first 136 and second 138 sections, wherein the first section 136 has a larger diameter than the second section 138. The first 136 and second 138 sections are separated by a transition plane 139. In one aspect, the transition plane 139 of the rivet 135 is substantially aligned with the second surface 89 of the base 85 of the torque plate 25, defining a shear plane, such that when a predetermined force is applied to the tire carrier assembly 10, the torque plate 25 breaks the rivet 135 along the shear plane. In this embodiment of the invention, the cover plate 40 may include a depression 165 formed about the rivet 135 that is received within the notch 150 of the arm portion 70 of the torque plate 25. In this manner, one may align the transition plane 139 of the rivet 135 with the second surface 89 of the base 85 of the torque plate 25 to ensure a clean shear of the rivet 135, as opposed to bending of the rivet 135.

After the rivet 135 has been sheared, the torque plate 25 can rotate about the shaft 15, as it is no longer constrained by the rivet 135 positioned within the notch 150. As the torque plate 25 rotates, the arm portion 70 contacts the inner surface 27 and/or bottom surface 47 of the housing 20. This contact between the arm portion 70 of the torque plate 25 and the inner surface 27 and/or bottom surface 47 of the housing 20 provides a controllable frictional resistance which, due to the operable engagement between the gear portion 95 of the torque plate 25 and the gear member 80 associated with the sheave 75, controls the rate of payout of cable from the sheave 75.

Figure 4:
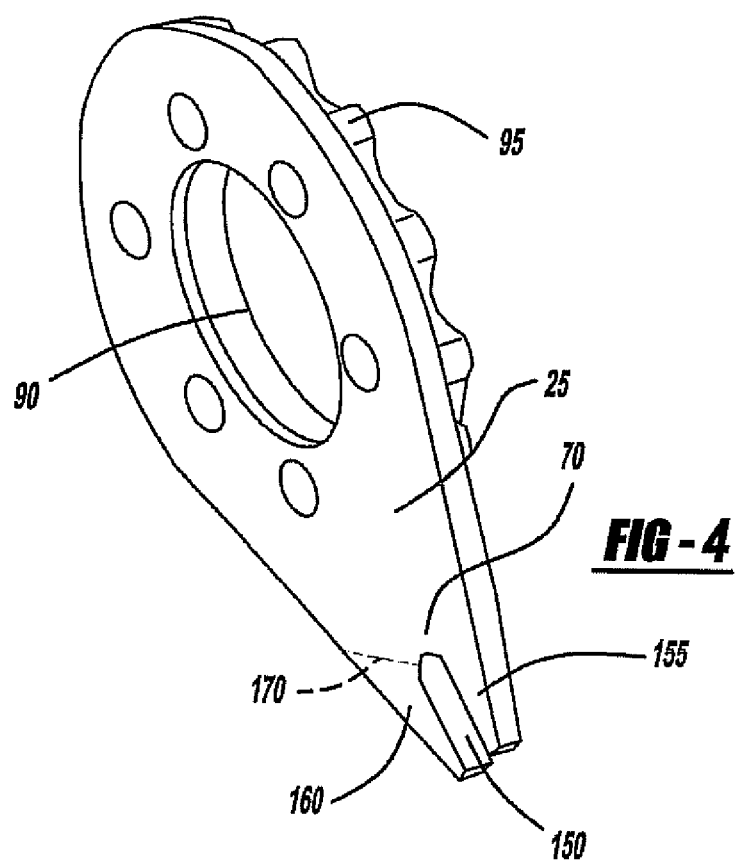
FIG. 4 is a perspective view of the torque plate according to an alternate embodiment of the invention.

Referring to FIGS. 3 and 4, another embodiment of the tire carrier assembly 10 is shown, wherein the trailing leg 160 of the arm portion 70 of the torque plate 25 is the frangible component, as opposed to the rivet 135 or cable guide 35 of the previous embodiments. In this embodiment, the rivet 135 does not include the first and second concentric sections 136, 138, but is rather designed to withstand the shear forces applied to it by the torque plate 25. The arm portion 70 of the torque plate 25 in this embodiment includes the forward 155 and trailing 160 legs separated by the notch 150, as described above. The trailing leg 160 of the arm portion 70 contacts the rivet 135 and breaks away from the torque plate 25 when a predetermined force is applied to the tire carrier assembly 10. The torque plate 25 may include a weakened portion 170, at which at least a portion of the trailing leg 160 can break away when the predetermined force is applied to the tire carrier assembly 10. The weakened portion 170 may be a scored or engraved area, a hole or any similar feature that weakens the arm portion 70 sufficiently to achieve the desired deformation in response to the predetermined force. As described above, once the trailing leg 160 of the torque plate 25 is deformed or sheared, the torque plate 25 can rotate about the shaft 15, such that the forward leg 155 of the torque plate 25 contacts the inner surface 27 and/or bottom surface 47 of the housing 20.

Figure 5:
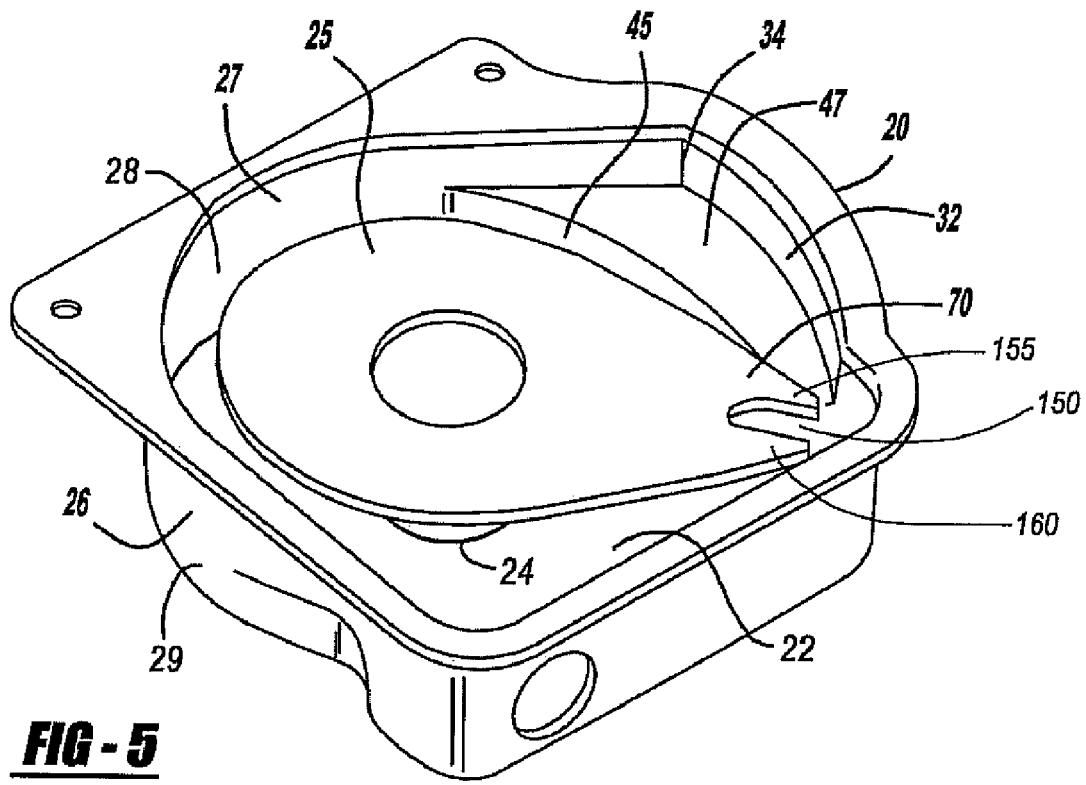
FIG. 5 is a plan view of the a torque plate and a first version of the housing, according to an alternative embodiment of the invention.

Referring to FIG. 5, a first version of the housing 20 is shown, wherein at least a portion of the inner surface 27 has a curved profile 32 and the inner surface 27 of the sidewall 26 includes a ledge 45 extending inwardly therefrom. The ledge 45 includes a bottom surface 47, which is shown illustratively as being generally planar. Other configurations of the bottom surface, however, may be utilized, as will be discussed further below.

Figure 6:
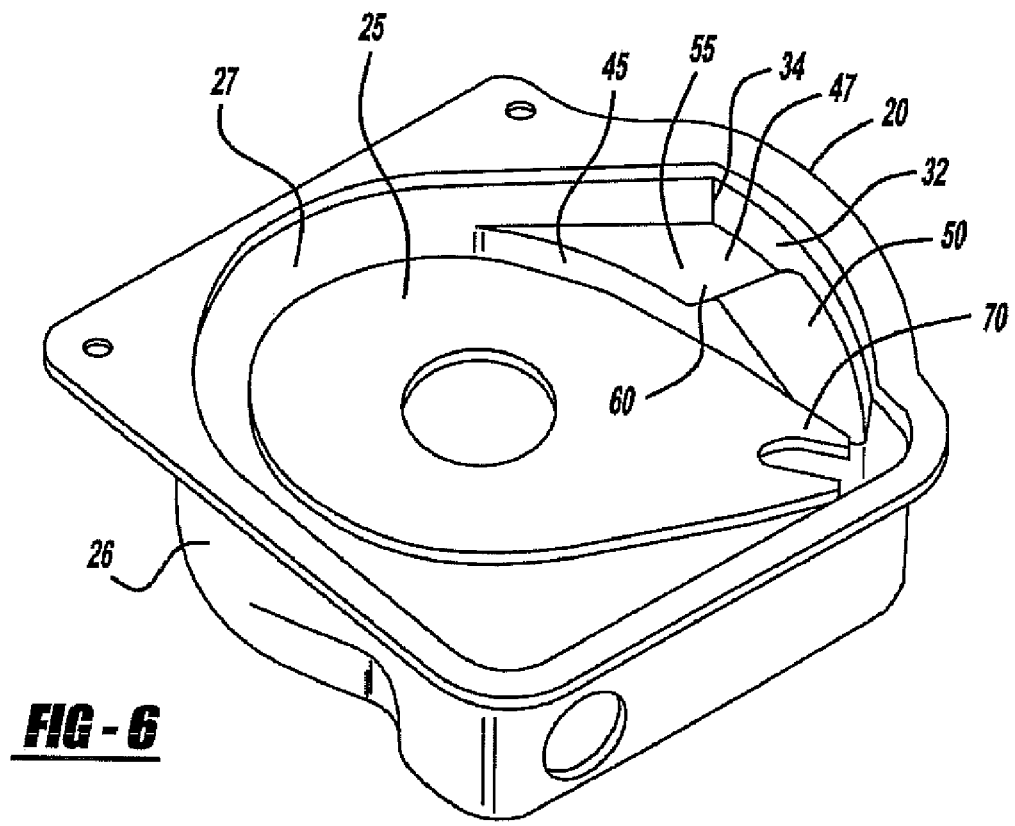
FIG. 6 is a perspective view of a torque plate and a second version of the housing, according to an alternate embodiment of the invention.

Referring to FIG. 6, a second version of the housing 20 is shown. As with the first version of the housing 20, the inner surface 27 of the sidewall 26 includes a curved profile 32 and an inwardly extending ledge 45. However, in the second version of the housing 20 shown in FIG. 7, the bottom surface 47 of the ledge 45 includes first and second sections 50, 55. The first section 50 includes an upward incline with the second section 55 having a relatively planar configuration. The first section 50 is preferably positioned above and separated from the second section 55 by a step 60.

Figure 7:
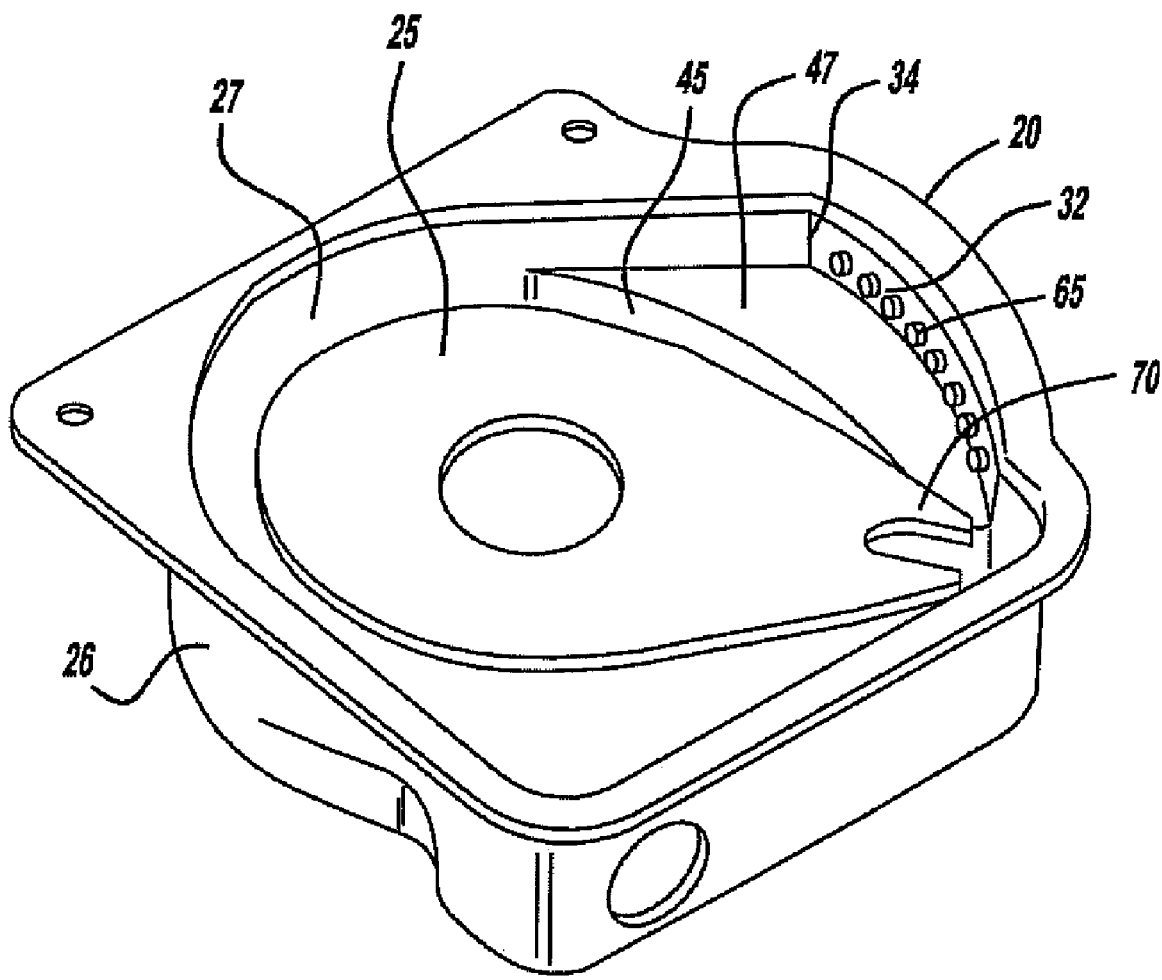
FIG. 7 is a perspective view of a torque plate and a third version of the housing, according to an alternate embodiment of the invention.

Referring to FIG. 7, a third version of the housing 20 is shown. The third version of the housing 20, as with the first and second versions, includes an inner surface 27 of a sidewall 26 having a curved profile 32, as well as an inwardly extending ledge 45 formed on the sidewall 26. The third version of the housing 20 further includes a series of lobes or bumps 65 formed on the inner surface 27 of the sidewall 26. The rate at which cable is paid out can be controlled by changing the curvature of the inner surface 27 of the housing 20, as well as the shape and thickness of the lobes 65 formed on the inner surface 27 of the housing 20. Additionally, the rate can be controlled by adjusting the size and steepness of the first section 50 of the bottom surface 47 of the ledge 45 which varies the frictional resistance applied to the torque plate 25. In this manner, various tire carrier assemblies 10 for different vehicles can be tuned to adjust the payout of cable to a specific level associated with a tire of that vehicle.

As can be seen in all three versions of the housing 20, the curved profile 32 terminates at a sharp angle 34. The sharp angle 34 provides a stop for engaging the arm portion 70 of the torque plate 25 when the torque plate 25 is allowed to rotate about the shaft 15 after breaking of the frangible component.

Figure 8:
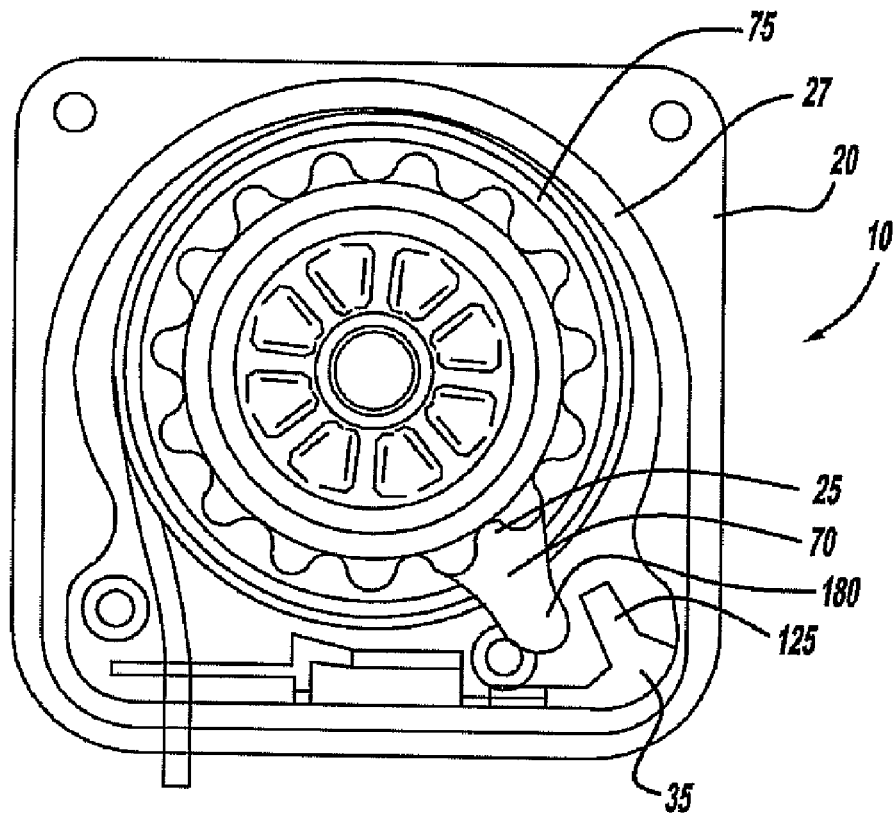
FIG. 8 is a plan view of a housing, torque plate, rivet and cable guide according to an alternative embodiment of the invention, wherein the cable guide is a frangible component.
Figure 9:
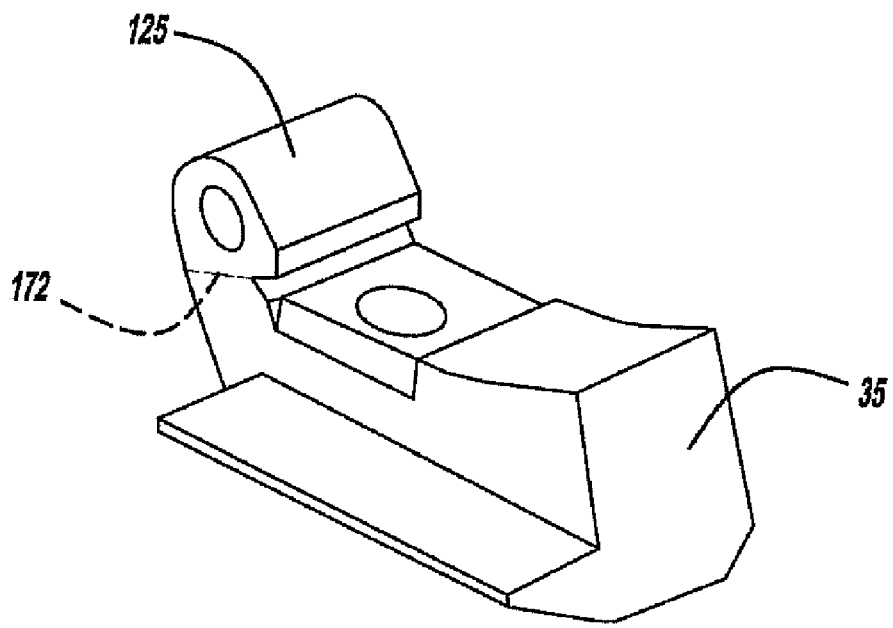
FIG. 9 is a perspective view of the cable guide in FIG. 8.
Figure 12:
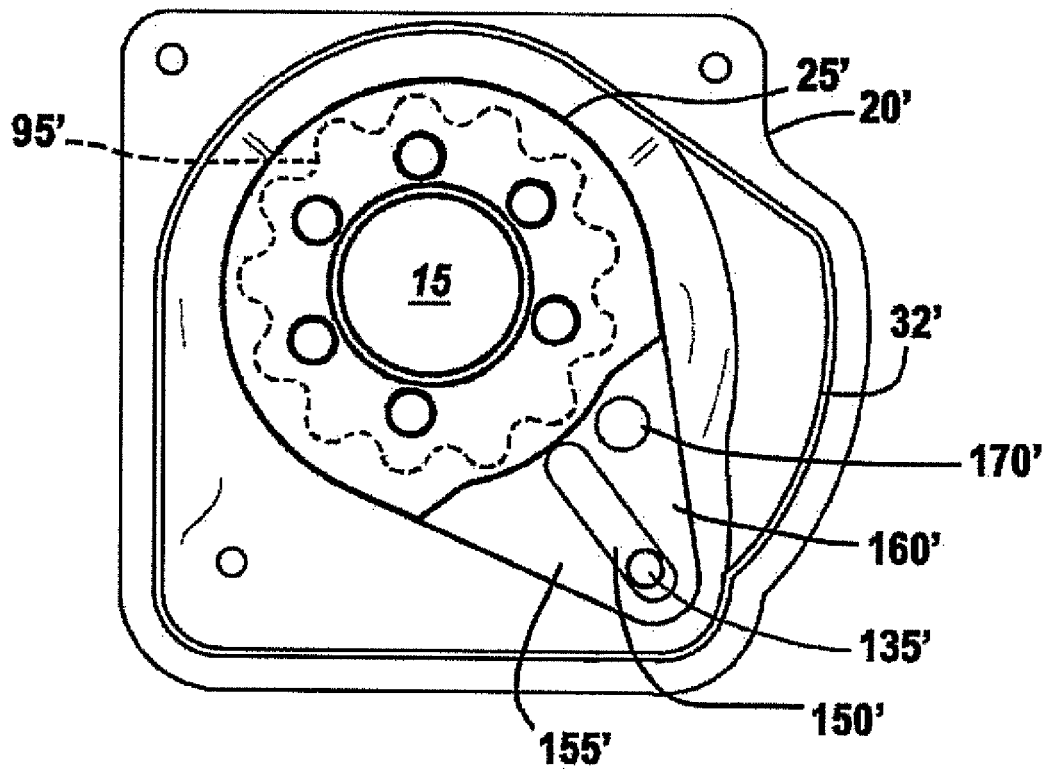
FIG. 12 is a plan view of the tire carrier assembly utilizing the torque plate of FIG. 10, according to an alternate embodiment of the invention.

Referring to FIGS. 8 and 9, an alternative embodiment of the tire carrier assembly 10 is shown, wherein the lobe 125 formed on the cable guide 35 is the frangible component. In this embodiment, the arm portion 70 of the torque plate 25 does not include a longitudinally extending notch 150, as in the previously described embodiments. The rivet 135 passes through the cover plate 40, but does not contact the torque plate 25 and is not positioned within the notch 150. Rather, the arm portion 70 of the torque plate 25 includes a single lobe 180 (FIG. 8) that is free to rotate and contacts a lobe 125 formed on the cable guide 35 preventing rotation of the torque plate 25. The cable guide 35 may include a weakened zone or break point 172 (FIG. 9) at which the lobe 125 shears after application of the predetermined force to the tire carrier assembly 10. Breaking the lobe 125 allows for rotation of the torque plate 25 about the shaft 15 and subsequent contact between the arm portion 70 and the inner surface 27 of the housing 20, as earlier described.

As shown in FIG. 1, the tire carrier assembly 10 of the invention may further include optional components, such as an anti-rotation member 190 that is positioned on the cable guide 35 and intersects with notches 195 formed on the integrally formed bounding wall 110 of the bushing 30 once the cable has completely paid out from the sheave 75. The anti-rotation member 190 prevents the cable from back winding upon the sheave 75 after it has been released.

Additionally, the tire carrier assembly 10 of the invention may include a clutch plate 200 that is adapted to releasably engage the bushing 30 and allow slip if an excessive force is applied to the rotation shaft 20. More specifically, the clutch plate 200 includes front and rear surfaces 205, 210 and a central aperture 215. The front surface 205 includes raised areas 220 formed about a peripheral edge that mates with detents 225 formed on the eccentric bushing 30. This design allows the clutch plate 200 to slip where a sufficient torque is applied to release the raised areas 220 from the detents 225.

Referring to FIGS. 10-11, another embodiment of the tire carrier assembly 10' is shown, wherein the arm portion 70' of the torque plate 25' includes a connecting wall 162 that extends between and connects the distal ends 156', 162' of the forward 155' and trailing 160' legs. As shown in the illustrated embodiment, the connecting wall 162' is integrally formed with the forward 155' and trailing 160' legs. By this arrangement, the notch 150' is close ended unlike the previously described embodiments. Additionally, a weakened portion 170' is provided on the arm portion 70' of the torque plate 25' so that the trailing leg 160' is the frangible component. Illustratively, the weakened portion 170' is a hole formed in arm portion 70' adjacent the trailing leg 160'. The connecting wall 162 resists the deformation of the trailing leg 160' in response to the application of the predetermined amount of force upon the tire carrier assembly and thereby provides a generally consistent range of deformation of the arm portion 70' irrespective of the location of the pin 135' within the slot.

Figure 13:
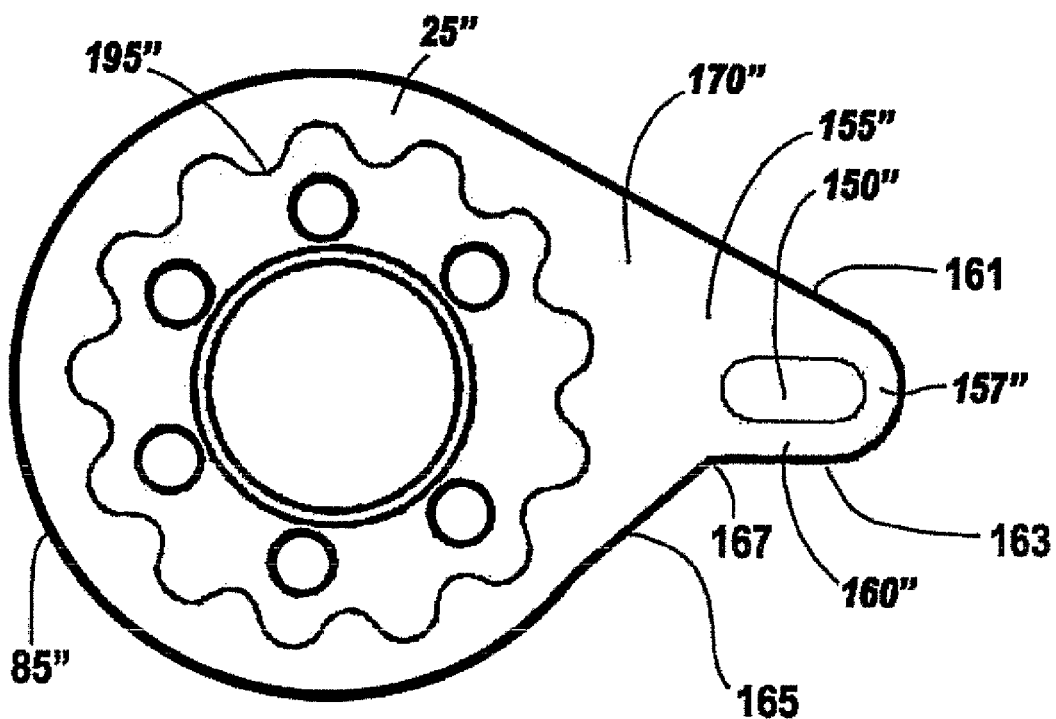
FIG. 13 is a top view of a torque plate according to an alternate embodiment of the invention.

Referring to FIG. 13, an alternate embodiment of the torque plate 25" is shown, wherein the trailing leg 160" is the frangible component due to the trailing leg 160" being smaller in size than the leading leg 155". More specifically, an outer edge 161 of the leading leg 155" is generally tangential with the circular-shaped base 85" of the torque plate 25" such that the leading leg 155" is substantially triangular shaped. The outer edge 163 of the trailing leg 160", on the other hand, is generally parallel with the notch 150" such that the trailing leg 160" is substantially rectangular or beam-shaped. The outer edge 163 of the trailing leg 160" intersects with a tangential edge 165 and forms a weakened portion in the form of a corner 167.

In another embodiment of the invention, the torque plates described herein may be formed of a powder metal. Powder metals are more brittle than conventional steel. As a result, a torque plate made from a powder metal will have high load capacity, but will also fracture more predictably or controllably along the weakened portions described above.

The invention has been described in an illustrative manner. It is to be understood that the terminology which has been used is intended to be in the nature of words of description rather than limitation. Many modifications and variations of the invention are possible in light of the above teachings. For example, any of the aforementioned embodiments of the tire carrier assembly can be used with any of the versions of the housing described above. Further, the tire carrier assembly may utilize a combination of the frangible components described above. Therefore, within the scope of the appended claims, the invention may be practiced other than as specifically described.

The invention claimed is:

1. A tire carrier assembly comprising:
   a housing having a bottom wall and a side wall extending outwardly from the bottom wall defining an interior space;
   a rotation shaft coupled to the housing and having a longitudinal axis;
   a sheave coupled to the shaft and rotatable about the longitudinal axis;
   a gear member extending from the sheave and rotatable therewith;
   a pin fixedly secured to the housing; and
   a torque plate having a gear portion epicyclically engaged with the gear member of the sheave, the torque plate having an arm portion extending generally radially outwardly with respect to the gear portion, the torque plate having a closed-ended slot formed in the arm portion and receiving the pin therethrough, the arm portion having legs extending along opposite sides of the slot, at least one of the legs having a weakened area at which the arm portion deforms in response to an application of a predetermined amount of force, which allows the torque plate to rotate non-epicyclically about the longitudinal axis and contact an inner surface of the housing controlling payout of a cable from the sheave.

2. The tire carrier assembly as set forth in claim 1, wherein the inner surface of the housing includes a curved profile along which the arm portion of the torque plate travels after the weakened area deforms allowing a variable engagement between the torque arm and the inner surface of the housing.

3. The tire carrier assembly as set forth in claim 2, wherein the curved profile terminates at an angle providing a stop for the rotational movement of the torque plate.

4. The tire carrier assembly as set forth in claim 2, wherein the inner surface of the housing includes a ledge extending inwardly therefrom and having a bottom surface that contacts the arm portion of the torque plate to provide the controlled payout of the cable from the sheave.

5. The tire carrier assembly as set forth in claim 4, wherein the bottom surface of the ledge includes first and second sections, the first section having an upward incline and the second section having a planar configuration, the first section positioned above and separated from the second section by a step.

6. The tire carrier assembly as set forth in claim 1, wherein the inner surface includes a plurality of lobes extending therefrom which contacts the torque plate after the weakened area deforms and allows a variable engagement between the lobes and spaces between the lobes and the torque arm to provide a controlled payout of the cable from the sheave.

7. The tire carrier assembly as set forth in claim 1, wherein the at least one of the legs of the arm portion is a trailing leg that contacts the pin and breaks away from the torque plate when a predetermined force is applied to the tire carrier assembly to provide a controlled payout of the cable from the sheave.

8. The tire carrier assembly as set forth in claim 7, wherein the legs terminate at a connecting wall that forms a closed end of the slot.

9. The tire carrier assembly as set forth in claim 8, wherein the connecting wall is arcuately shaped.

10. The tire carrier assembly as set forth in claim 7, wherein each leg includes an outer edge disposed on opposite sides of the slot.

11. The tire carrier assembly as set forth in claim 10, wherein one of the legs is a leading leg disposed on an opposite side of the slot from the trailing leg, wherein the outer edge of the leading leg is substantially tangential with respect to the base portion.

12. The tire carrier assembly as set forth in claim 11, wherein the outer edge of the trailing leg is generally parallel with the slot in the arm portion of the torque plate.

13. The tire carrier assembly as set forth in claim 12, wherein the outer edge of the trailing leg intersects with a tangential edge that extends along on an opposite side of the torque plate from the outer edge of the leading leg.

14. The tire carrier assembly as set forth in claim 13, wherein outer edge of the trialing leg and the tangential edge intersect to form a corner that provides the weakened area.

15. The tire carrier assembly as set forth in claim 1, wherein the weakened area is a hole that extends through the arm portion and is spaced apart from the slot.

16. A tire carrier assembly comprising:
a sheave rotatable about a rotational axis;
a cable having an end coupled to the sheave for winding thereabout or payout therefrom during corresponding rotation of the sheave about the rotational axis;
a torque plate coupled to the sheave by a gear arrangement and movable generally epicyclically with respect to the sheave during winding and payout of the cable from the sheave; and
a force-responsive component including a radially outwardly extending arm portion of the torque plate having a closed ended slot formed therein and having a first state in which the torque plate is limited to the generally epicyclical movement during the winding and payout of the cable from the sheave, the force-responsive component further having a second state in which the force-responsive component is deformed and allows the torque plate to rotate about the rotational axis non-epicyclically and to contact an adjacent component within the tire carrier assembly so as to controlling payout of the cable from the sheave, wherein the second state is initiated by an application of a threshold amount of force upon the tire carrier assembly.

17. A tire carrier assembly as set forth in claim 16, wherein the arm portion is slidably coupled to a fixed support in the tire carrier assembly by a pin positioned in the closed ended slot, the closed ended slot extending generally radially with respect to the rotational axis.

18. A tire carrier assembly as set forth in claim 16, wherein the arm portion includes a pair of legs extending along opposite sides of the slot.

19. A tire carrier assembly as set forth in claim 18, wherein the arm portion includes a connecting wall extending between distal ends of the pair of legs and forming the closed end of the slot.

20. A tire carrier assembly as set forth in claim 19, wherein the arm portion includes a weakened area adjacent one of the legs allowing deformation of the leg in response to the application of a threshold amount of force upon the tire carrier assembly.

21. A tire carrier assembly as set forth in claim 16 including a housing having an interior space in which the torque plate is housed.

22. A tire carrier assembly as set forth in claim 21, wherein the adjacent component engaged by the torque arm after deformation of the force-responsive component is an inner surface of the housing.

23. A tire carrier assembly as set forth in claim 16, wherein the force responsive component deforms in response to a substantially consistent threshold amount of force irrespective of the position of the torque plate relative to the sheave.

* * * * *